(12) United States Patent
Li et al.

(10) Patent No.: US 6,590,873 B1
(45) Date of Patent: Jul. 8, 2003

(54) CHANNEL STRUCTURE FOR FORWARD LINK POWER CONTROL

(75) Inventors: Quinn Li, Madison, NJ (US); Martin Howard Meyers, Montclair, NJ (US); John Minkoff, Englewood, NJ (US); Xiao Cheng Wu, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/245,204

(22) Filed: Feb. 5, 1999

(51) Int. Cl.⁷ .............................. H04B 7/185
(52) U.S. Cl. .................. 370/318; 370/491; 370/500
(58) Field of Search ................. 370/318, 465, 370/441, 342, 491, 498, 500, 335; 455/403, 420, 511, 522, 525

(56) References Cited

U.S. PATENT DOCUMENTS

| | | | | |
|---|---|---|---|---|
| 5,903,554 A | * | 5/1999 | Saints | 370/342 |
| 5,982,760 A | * | 11/1999 | Chen | 370/335 |
| 6,088,324 A | * | 7/2000 | Sato | 370/203 |
| 6,166,622 A | * | 12/2000 | Hosur et al. | 340/318 |
| 6,233,439 B1 | * | 5/2001 | Jalali | 455/127 |
| 6,304,562 B1 | * | 10/2001 | Kim et al. | 370/332 |
| 2002/0009061 A1 | * | 1/2002 | Willenegger | 370/328 |
| 2002/0009096 A1 | * | 1/2002 | Odenwalder | 370/441 |

FOREIGN PATENT DOCUMENTS

| | | | | |
|---|---|---|---|---|
| AT | 0893889 A2 | * | 1/1999 | H04B/1/707 |
| AU | WO 99/66743 | * | 12/1999 | H04Q/7/20 |
| BE | WO 00/02398 | * | 1/2000 | |

* cited by examiner

Primary Examiner—Thanh Cong Le
Assistant Examiner—C. Chow

(57) ABSTRACT

The invention is a method for controlling power on multiple forward link communication channels by using multiple power control sub-channels, wherein each power control sub-channel is associated with a forward link communication channel to be power controlled. A fundamental power control sub-channel and a supplemental power control sub-channel are time multiplexed onto a reverse pilot channel. Transmitted over the fundamental power control sub-channel is a fundamental power control bit for indicating to a base station to increase or decrease its transmission power over a corresponding forward fundamental channel. Transmitted over the supplemental power control sub-channel is a supplemental power control bit for indicating to a base station to increase or decrease its transmission power over a corresponding forward supplemental channel. The pilot sub-channels are preferably separated by the fundamental and supplemental power control sub-channels for time diversity purposes.

19 Claims, 2 Drawing Sheets

CHANNEL STRUCTURE FOR FORWARD LINK POWER CONTROL

FIELD OF THE INVENTION

The present invention relates generally to wireless communications systems and, in particular, to forward link power control in wireless communications systems.

BACKGROUND OF THE RELATED ART

Wireless communications systems use power control to improve system performance and increase system capacity. Power control involves tracking possible fading of communication channels and using the tracked fading to manage the power at which signals are being transmitted from base stations (in order to compensate for the fading). Prior art Code Division Multiple Access (CDMA) wireless communications systems based on the well-known IS-95 standard use error indicator bits to assist in controlling transmission power at the base station. Power control is implemented in the following manner.

When a call is set up in a prior art CDMA wireless communications system, a base station and a mobile-telephone communicate voice (or data) over a forward and a reverse link, wherein the forward link includes communication channels for transmitting signals from the base station to the mobile-telephone and the reverse link includes communication channels for transmitting signals from the mobile-telephone to the base station. Specifically, the base station transmits voice (or data) to the mobile-telephone over a communication channel referred to herein as a forward traffic channel, and the mobile-telephone transmits voice (or data) to the base station over a communication channel referred to herein as a reverse traffic channel. In either traffic channel, voice is transmit over 20 ms time intervals referred herein to as frames. Each forward traffic frame (i.e., frames transmitted over the forward traffic channel) includes voice (or data) and error control information in the form of a cyclical redundancy code (CRC). By contrast, each reverse traffic frame (i.e., frames transmitted over the reverse traffic channel) includes voice (or data) and error indicator bits (EIB) for indicating whether the last forward traffic frame is a good frame or in erasure, i.e., a bad frame.

When a base station transmits a forward traffic frame, a mobile-telephone receiving the forward traffic frame will check the CRC to determine whether the forward traffic frame is good or not. The mobile-telephone will indicate such determination to the base station using the EIB in the next reverse traffic frame the mobile-telephone will transmit. For example, a positive error indicator bit indicates no error in the forward traffic frame, and a negative error indicator bit indicates the forward traffic frame is a bad frame. Upon receiving reverse traffic frames from the mobile-telephone, the base station examines the error indicator bits and determines whether its forward link to the mobile-telephone is in fading, and adjusts the power of its forward link accordingly. For example, if the base station receive one or more successive error indicator bits denoting erred forward traffic frames, the base station may determine that its forward link is in fading and increase the power of its forward link.

In prior art CDMA wireless communications systems, a set of traffic channels (i.e., forward and reverse traffic channels) is used by the mobile-telephone to transmit either voice or data, but not both simultaneously, to and from the base station. In newly proposed CDMA (hereinafter referred to as CDMA 2000) wireless communications system, separate communication channels, referred to herein as forward and reverse fundamental and supplemental channels, may be used by the mobile-telephone to simultaneously transmit voice and data, respectively, to and from the base station. In other words, mobile-telephones using the CDMA 2000 wireless communications system may use multiple communication channels to transmit both voice and data at the same time. Accordingly, there exists a need for controlling power on multiple forward link communication channels, e.g., forward fundamental and supplemental channels.

SUMMARY OF THE INVENTION

The present invention is a method for controlling power on multiple forward link communication channels by using multiple power control sub-channels, wherein each power control sub-channel is associated with a forward link communication channel to be power controlled. In one embodiment, a fundamental power control sub-channel and a supplemental power control sub-channel are time multiplexed onto a reverse pilot channel, thus the reverse pilot channel comprises pilot, fundamental power control and supplemental power control sub-channels. Transmitted over the fundamental power control sub-channel is a fundamental power control bit for indicating to a base station to increase or decrease its transmission power over a corresponding forward fundamental channel. Transmitted over the supplemental power control sub-channel is a supplemental power control bit for indicating to a base station to increase or decrease its transmission power over a corresponding forward supplemental channel. Each pilot control sub-channel may be separated by, at least one power sub-channel for time diversity purposes in order to better combat fading of the pilot channel.

BRIEF DESCRIPTION OF THE DRAWINGS

The features, aspects, and advantages of the present invention will become better understood with regard to the following description, appended claims, and accompanying drawings where:

DETAILED DESCRIPTION

Figure 1:
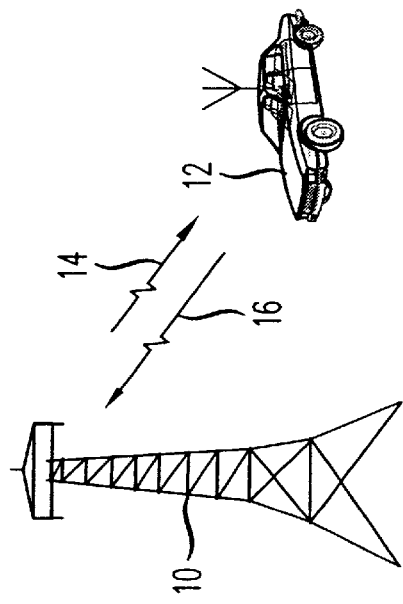
FIG. 1 depicts a base station and a mobile-telephone used in accordance with the present invention.

FIG. 1 depicts a base station 10 and a mobile-telephone 12 used in accordance with the present invention. Base station 10 and mobile-telephone 12 both communicate using forward link 14 and reverse link 16 employing well-known Code Division Multiple Access (CDMA) 2000 techniques. This should not be construed to limit the present invention to base stations and mobile-telephones employing CDMA 2000 techniques. The present invention may equally be applicable to base stations and mobile-telephones employing other CDMA technique and other multiple access techniques.

Figure 2:
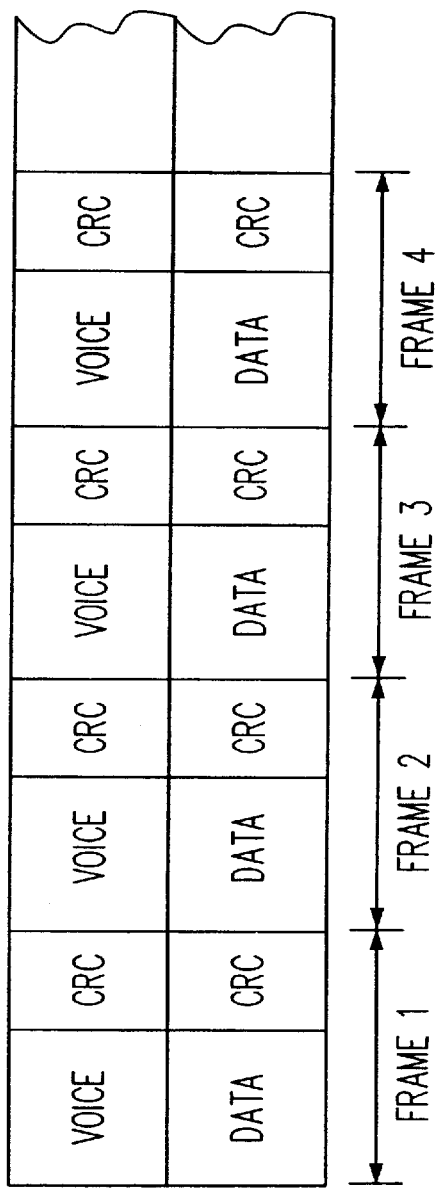
FIG. 2 depicts frames of voice, data and error control information being transmitted over a forward fundamental and supplemental channel.

Forward link 14 comprises a plurality of communication channels including, but not limited to, a forward fundamental channel for transmitting voice and a forward supplemental channel for transmitting data. In the forward fundamental and supplemental channels, voice and data are transmitted over 20 ms time intervals referred to herein as frames, as shown in FIG. 2. Each frame of the forward fundamental channel (hereinafter referred to as "forward fundamental frame") comprises voice and error control information in the form of a cyclical redundancy code (CRC), whereas each frame of the forward supplemental channel (hereinafter referred to as "forward supplemental frame") comprises data and error control information in the form of a CRC.

Figure 3:
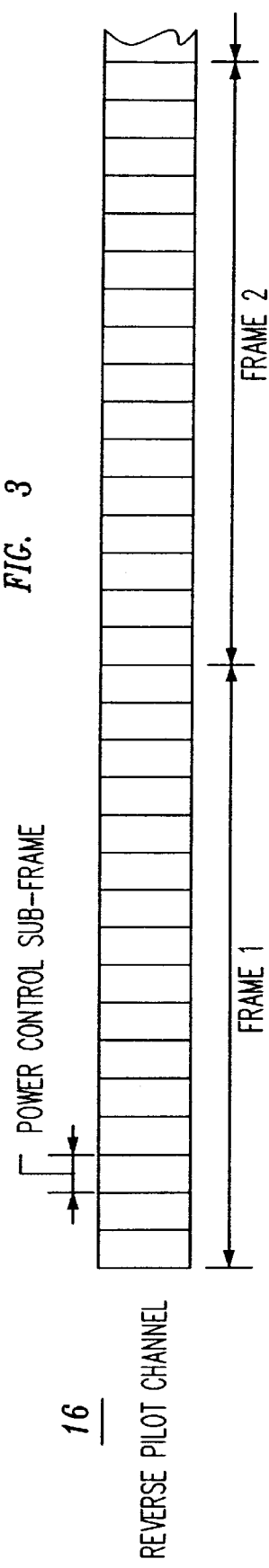
FIG. 3 depicts a reverse pilot channel divided into frames and further divided into power control sub-frames.

Reverse link 16 comprises a plurality of communication channels including, but not limited to, a reverse pilot channel for transmitting a pilot and power control bits. In the reverse pilot channel, the pilot and power control bits are transmitted over 20 ms time intervals or frames, as shown in FIG. 3. Each frame of the reverse pilot channel comprises sixteen 1.25 ms time intervals referred to herein as power control sub-frames over which a power control group is transmitted, wherein each pilot control sub-frame comprises four sub-channels and each power control group comprises four bits representing a pilot and power control. In each sub-channel, a single bit may be transmitted, wherein each bit comprises 384×N symbols and N represents a chip rate (as specified in the CDMA 200 ITU-R RTT Candidate Submission 0–18). For example, for a chip rate of 1.2288 Mcps, N equals 1; and for a chip rate of 3.6864, N equals 3.

Figure 4:
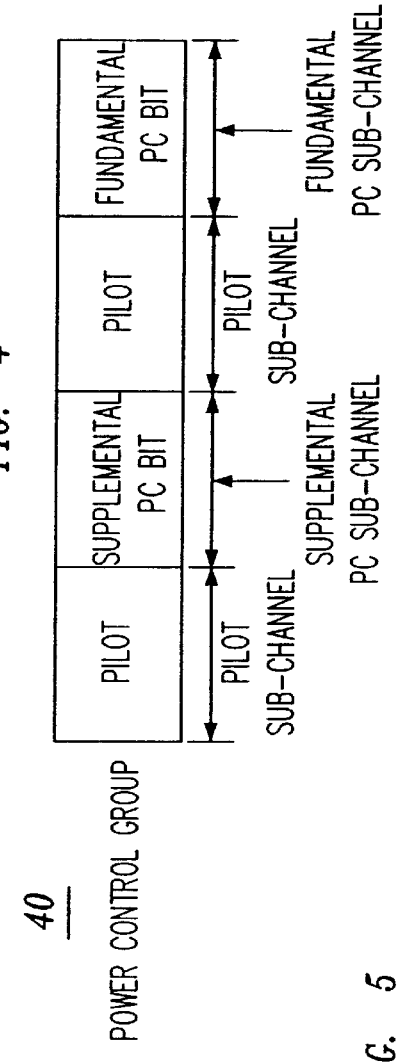
FIG. 4 depicts an embodiment of a power control group.

The particular bit being transmitted over each of the sub-channels depends on whether mobile-telephone 12 is currently using both the forward fundamental and supplemental channels. FIG. 4 depicts a structure for a power control group 40 that is transmitted over a power control sub-frame when mobile-telephone is using both the forward fundamental and supplemental channels. Power control group 40 comprises four bits. The first bit is a pilot bit (i.e., a bit that is a part of a sequence of bits that make up the pilot) which is transmitted over a pilot sub-channel. The second bit is a supplemental power control bit for indicating to base station 10 whether to increase or decrease the transmission power for mobile-telephone 12's forward supplemental channel. The supplemental power control bit is transmitted over a supplemental power control sub-channel. The third bit is another pilot bit which is transmitted over a second pilot sub-channel. The fourth bit is a fundamental power control bit for indicating to base station 10 whether to increase or decrease the transmission power for mobile-telephone 12's forward fundamental channel. The fundamental power control bit is transmitted over a fundamental power control sub-channel. Thus, the pilot sub-channels are the first and third sub-channels of the pilot control sub-frame, and the supplemental and fundamental sub-channels are the second and fourth sub-channels, respectively, of the power control sub-frames.

Alternately, the second bit of the power control group may be the fundamental power control bit and the fourth bit of the power control group may be the supplemental power control bit, or the second and fourth bits may be pilot bits and the first and third (or third and first) bits may be fundamental and supplemental power control bits. Note that separation of the pilot sub-channels with the power control sub-channels provides time diversity for better combating fading of the pilot channel. In another embodiment, the first two sub-channels are pilot sub-channels and the last two sub-channels are the supplemental power control sub-channel and the fundamental power control sub-channel (or vice-versa).

Figure 5:
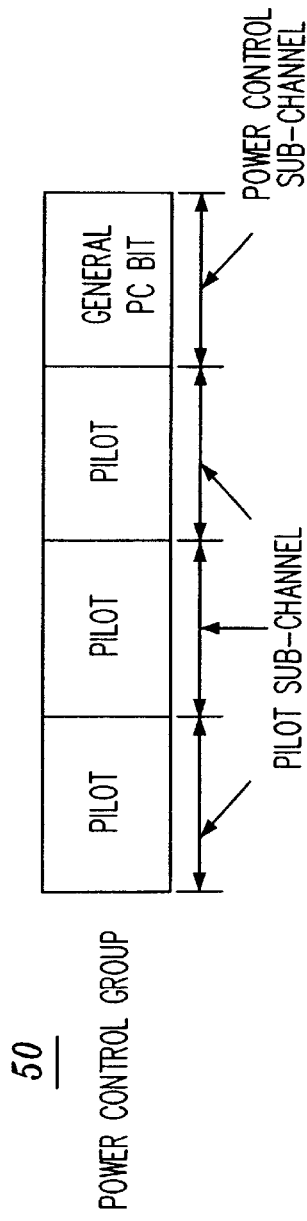
FIG. 5 depicts another embodiment of a power control group.

By contrast, FIG. 5 depicts a structure for a power control group 50 when mobile-telephone is using only either the forward fundamental channel or the forward supplemental channel, but not both channels. Like the power control group 40, the structure for the power control group 50 comprises four bits. In power control group 50, the first three bits are pilot bits and the fourth bit is a general power control bit. The pilot bits are transmitted over three pilot sub-channels, which are the first three sub-channels of a power control sub-frame. The fourth bit is a general power control bit for indicating to base station 10 whether to increase or decrease the transmission power for a forward link communication channel (for transmitting voice or data) being used by mobile-telephone 12. The general power control bit is transmitted over a power control sub-channel, which is the fourth sub-channel of a power control sub-frame.

Many different criteria may be used to determine whether to transmit a positive or a negative power control bit, wherein a positive power control bit indicates to base station 10 to increase power on the forward fundamental and/or supplemental channels and a negative power control bit indicates to base station 10 to decrease power on the forward fundamental and/or supplemental channels. In one embodiment, mobile-telephone 12 transmits a negative power control bit if an $E_b/N_t$ ratio (of a power control sub-frame) for the communication channel (i.e., forward fundamental or supplemental channel) to be power controlled is above a threshold value (for that communication channel), wherein the $E_b/N_t$ ratio represents the total energy per bit over total noise plus interference density. Note that a power control sub-frame for a communication channel corresponds to a time interval approximately equal to a power control sub-frame for the reverse pilot channel. Otherwise mobile-telephone 12 transmits a positive power control bit. For example, suppose the $E_b/N_t$ ratio for mobile-telephone's forward fundamental channel is below the threshold value for the forward fundament channel, but the $E_b/N_t$ ratio for mobile-telephone's forward supplemental channel is above the threshold value for the-forward supplemental channel. In this example, mobile-telephone 12 would transmit a positive fundamental power control bit and a negative supplemental control bit.

In another embodiment, mobile-telephone 12 checks the CRC of each data and/or traffic frame to determine whether an error occurred in the transmission of the data and/or traffic frame. If an error occurred, mobile-telephone 12 transmits a positive power control bit (to indicate to base station 10 to increase power over the communication channel on which the error occurred). Otherwise mobile-telephone 12 transmits a negative power control bit. Alternately, if an error occurred, mobile-telephone 12 increases the threshold value for the $E_b/N_t$ ratio. Otherwise, mobile-telephone 12 decreases the threshold value for the $E_b/N_t$ ratio.

Although the present invention has been described in considerable detail with reference to certain embodiments, other versions are possible. Therefore, the spirit and scope of the present invention should not be limited to the description of the embodiments contained herein.

We claim:

1. A method for controlling transmit power in a wireless communication system comprising the steps of:

determining whether to increase or decrease transmit power on a first and a second communication channel of a communication link of a base station; and transmitting a power control group over a reverse pilot channel, the power control group including pilot bits, a first power control bit for controlling transmit power on the first communication channel of the link and a second power control bit for controlling transmit power on the second communication channel of the link.

2. The method of claim 1, wherein the reverse pilot channel includes a power control sub-frame having a first pilot sub-channel for transmitting a first pilot bit, a first power control sub-channel for transmitting the first power control bit, a second pilot sub-channel for transmitting a second pilot bit and a second power control sub-channel for transmitting the second power control bit.

3. The method of claim 2, wherein the first and second pilot sub-channels are separated by the first and second power control sub-channels.

4. The method of claim 1, wherein $E_b/N_t$ ratios for the first and second communication channels are used for determining whether to increase or decrease transmit power on the first and second communication channels.

5. The method of claim 4, wherein a negative first power control bit is transmitted if it is determined that an $E_b/N_t$ ratio for the first communication channel is above a threshold value.

6. The method of claim 4, wherein a positive first power control bit is transmitted if it is determined that an $E_b/N_t$ ratio for the first communication channel is below or at a threshold value.

7. The method of claim 4, wherein a negative second power control bit is transmitted if it is determined that an $E_b/N_t$ ratio for the second communication channel is above a threshold value.

8. The method of claim 4, wherein a positive second power control bit is transmitted if it is determined that an $E_b/N_t$ ratio for the second communication channel is below or at a threshold value.

9. The method of claim 1, wherein cyclical redundancy codes transmitted over the first and second communication channels are used for determining whether to increase or decrease transmit power on the first and second communication channels.

10. The method of claim 1, wherein the first communication channel is a forward supplemental channel.

11. The method of claim 1, wherein the second communication channel is a forward fundamental channel.

12. A method for controlling transmit power in a wireless communication system comprising the steps of:

determining whether to increase or decrease transmit power on a communication channel of a communication link of a base station; and transmitting a power control group over a reverse pilot channel, the power control group including pilot bits and a power control bit for controlling transmit power on the communication channel.

13. The method of claim 12, wherein the reverse pilot channel includes a pilot control sub-frame having a first, second and third pilot sub-channel over which the pilot bits are transmitted and a power control sub-channel over which the power control bit is transmitted.

14. The method of claim 12, wherein the communication channel is a forward fundamental channel.

15. The method of claim 12, wherein the communication channel is a forward supplemental channel.

16. A method for controlling transmit power in a wireless communication system comprising the steps of:

receiving a power control group over a reverse pilot channel of a communication link of a base station, the power control group including pilot bits, a first power control for controlling transmit power on a first communication channel of the link and a second power control bit for controlling transmit power on a second communication link of the link;

adjusting transmit power on the first and second communication channels using the first and second power control bits being received.

17. The method of claim 16, wherein the power control group includes a first, second, third and fourth bit, the first bit being a pilot bit, the second bit being a first power control bit, the third bit being another pilot bit and the fourth bit being a second power control bit.

18. The method of claim 17, wherein the first power control bit indicates whether to increase or decrease transmit power on a forward fundamental channel and the second power control bit indicates whether to increase or decrease transmit power on a forward supplemental channel.

19. The method of claim 17, wherein the first power control bit indicates whether to increase or decrease transmit power on a forward supplemental channel and the second power control bit indicates whether to increase or decrease transmit power on a forward fundamental channel.

* * * * *